Aug. 22, 1972  W. R. BROYLES ET AL  3,686,043
METHOD FOR REDUCING INTERLAMINATE BONDING
IN MAGNETIC CORES
Filed Feb. 18, 1971

INVENTORS
William R. Broyles &
BY Robert L. Search

L. Warren Smith
ATTORNEY

United States Patent Office 3,686,043
Patented Aug. 22, 1972

3,686,043
METHOD FOR REDUCING INTERLAMINATE BONDING IN MAGNETIC CORES
William R. Broyles, Centerville, and Robert L. Search, Dayton, Ohio, assignors to General Motors Corporation, Detroit, Mich.
Filed Feb. 18, 1971, Ser. No. 116,521
Int. Cl. C21d 1/74; H01f 1/16
U.S. Cl. 148—112                                   4 Claims

ABSTRACT OF THE DISCLOSURE

In a preferred form, a method for the manufacture of laminated magnetic cores includes the use of a heat expandable fixture for reducing the tendency of adjacent laminations to become bonded during heat treating operations. The heat expandable fixture expands into engagement with the edges of the magnetic core laminations at the elevated temperatures developed during the heat treating operations. The laminations are maintained in an upright orientation by the fixture and are deflected by the expansion forces developed between the heat expandable fixture and the laminations. This decreases the effectiveness of the heat treating atmosphere and high heat conditions in developing interlaminate bonds.

BACKGROUND OF THE INVENTION

This invention relates to an improved method for the manufacture of laminated magnetic cores subjected to heat treating operations and more particularly to a method for reducing the interlaminate bonding of laminated magnetic cores during heat treating operations.

Magnetic cores for electrical apparatus such as electrodynamic machines, transformers and other inductive devices are typically formed by stacking a series of laminations in facing registration and then fastening the laminations together by one of several known techniques including welding, keys and interlocking tabs. The magnetic cores are made of relatively thin laminations rather than a solid part to reduce magnetic losses caused by eddy currents induced in the cores. Following the stacking and fastening together of the laminations to form the magnetic cores, the cores are usually subjected to one or more heat treating operations to improve the mechanical and electrical characteristics. A commonly employed heat treating operation is annealing at elevated temperatures in a furnace having controllable atmospheres.

One recognized problem associated with the annealing of laminated magnetic cores is the tendency of adjacent facing laminations to stick together. This substantially increases the core losses and reduces the efficiency of heat treating operations subsequent to annealing. The reasons for the interlaminate bonding is not entirely understood, however, it is believed that at least part of the bonding is created by the formation of oxide and/or iron composition coatings on the lamination faces. Diffusion of these coatings between adjacent faces of the laminations is effective to form low resistance interlaminate bonds. This reduces the effectiveness of the laminations since they normally must be insulated from each other. When the laminations are insulated they break up the induced eddy currents into a large number of high resistance paths. This generates substantially less core loss in the form of heat than do the fewer low resistance paths provided in a solid magnetic core.

A further condition that is believed to contribute to the interlaminate bonding during annealing is the positioning of the ends of the magnetic cores so they are laid flat in the furnace. This orients the faces of the laminations horizontally causing the weight of the upper laminations to press downward on the lower laminations. The lamination faces are pressed into further contact while in an activated state for creating the interlaminate bonding.

In order to eliminate the interlaminate bonds caused by the annealing conditions, the laminations must be separated so that they are sufficiently insulated from each other. Separation of the laminations is provided by subjecting the laminated magnetic cores to impacting, referred to as cracking. This is often done by striking the core with a mallet or dropping it on a solid support. Alternative techniques for cracking include manually prying the laminations apart, vibrating or developing magnetic separating forces between adjacent laminations, referred to as magnetic cracking. An example of the latter technique is disclosed and claimed in copending application Ser. No. 17,378, filed Mar. 9, 1970, and assigned to the assignee of this invention.

One particularly undesirable result of cracking is that the impact forces often damage the alignment of the laminations or can damage the means fastening the laminations together. For example in welded magnetic cores, the welds are often broken or destroyed by the impacts rendering the magnetic cores unusable. It is further recognized that separation of the laminations by cracking is often time consuming and increases costs and difficulty in controlling mass production processes for making the magnetic cores.

SUMMARY OF THE INVENTION

In accordance with one aspect of the method of this invention, a heat expandable fixture is mounted in a center opening of a laminated magnetic core following stacking and fastening together of a series of laminations to form the magnetic core. The magnetic core is positioned within a furnace for a heat treating operation so that the faces of the laminations are oriented vertically with the center opening extending horizontally. Elevated temperatures developed in the furnace expand the heat expandable fixture radially against the sides of the center opening to engage and hold the edges of each lamination. The vertically supported relationship of the adjacent facing laminations and deflection thereof by expanding engagement with the heat expandable fixture substantially reduces interlaminate bonding during the heat treating operation.

Accordingly, it is an important object of this invention to provide an improved method in the manufacture of laminated magnetic cores subjected to a heat treating operation in which interlaminate bonding occurs to increase core losses and decrease the efficiency of subsequent heat treating operations, wherein a heat expandable fixture expands radially against the edges of the laminations forming the magnetic core so as to resist the tendency of adjacent faces of the laminations to stick together because of the activation of the faces for interlaminate bonding.

Another object of this invention is to provide an improved method for reducing interlaminate bonding of laminated stator cores made for dynamoelectric machines in which the stator core is subjected to annealing, wherein the stator core is positioned within a furnace in a vertical orientation so that the weight of the laminations is prevented from pressing the adjacent faces of the laminations together, and further wherein a cylindrical stainless steel plug forming a heat expandable fixture having a higher coefficient of expansion than that of the stator core is mounted in the stator bore opening so as to expand at the elevated annealing temperatures and engage the edges of the laminations along the bore opening throughout the annealing operation to support and deflect the laminations and substantially reduce bonding engagement therebetween.

3

Further objects and advantages of the present invention will be apparent from the following description, reference being had to the accompanying drawing wherein a preferred embodiment of the present invention is clearly shown.

DESCRIPTION OF THE PREFERRED EMBODIMENT

Figure 1:
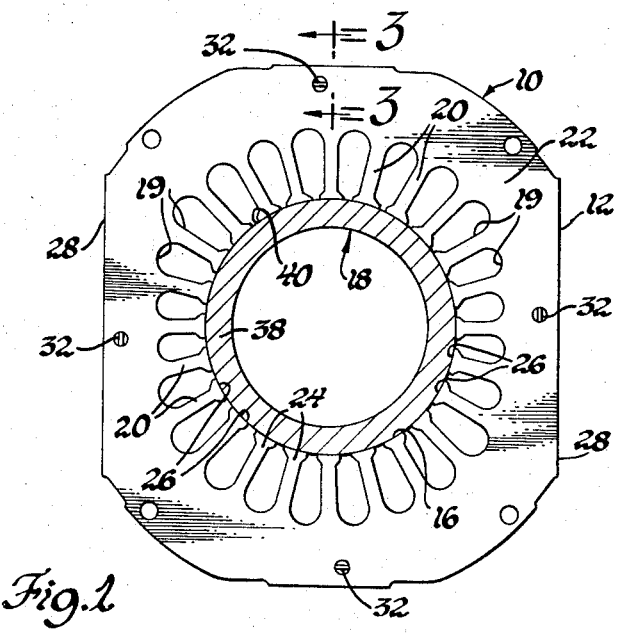
FIG. 1 is a sectional end view taken along axis 1—1 in FIG. 2 illustrating a laminated magnetic core having a heat expandable fixture mounted in a center opening thereof in accordance with the method of this invention.
Figure 2:
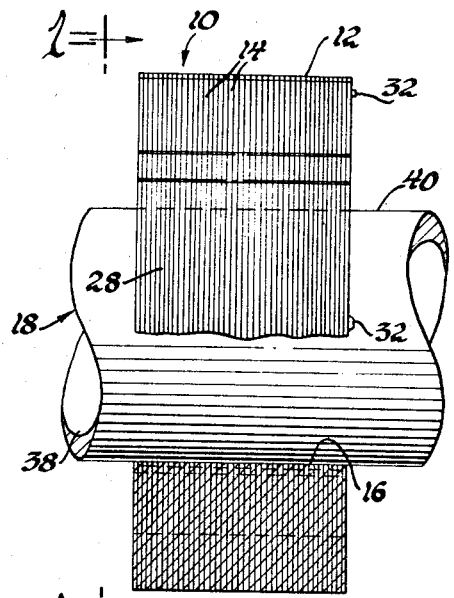
FIG. 2 is a sectional side view illustrating the laminated magnetic core and the heat expandable fixture.

Referring now to the drawing and more particularly to FIGS. 1 and 2 wherein there is illustrated a laminated magnetic core 10 which includes, for purposes of describing one example of the method of this invention, a stator core 12 for a dynamoelectric machine. Laminations 14 made from a magnetizable thin sheet metal material are stacked and fastened together to form the stator core 12. The stacked laminations 14 define a center bore opening 16 extending longitudinally through the stator core 12. A cylindrical plug 18 which forms a heat expandable fixture in accordance with the method of this invention is illustrated removably mounted in the bore opening 16 described further hereinbelow.

The laminations 14 are made, in one specific example, from a full-hard silicon lamination steel having a thickness on the order of 0.025 inch. A series of progressive die stamping operations cut a circumferential series of winding accommodations slots 19 which form arcuately spaced teeth 20 extending radially inward from a yoke section 22. Flared tooth tips 24 terminate the teeth 20. The arcuately extending ends of the tooth tips 24 form the inner edges 26 of the laminations and define the cylindrically shaped sides of the bore opening 16. The slots 19 extending from the bore opening 16 are adapted to receive coil windings, not shown, which are inductively coupled to the stator core 12. The outer edges 28 of the laminations 14 are cut from the sheet metal material so as to have a generally rectangular shape including rounded corners. When the laminations 14 are stacked, the outer edges 28 form the outer sides of the stator core 12.

The laminations 14 are assembled together by known techniques, such as mounting over a mandrel, so as to form a stack of the laminations 14 which are in axial registration and have a predetermined stack height. When a predetermined stack height is provided, corresponding to the horizontal length of the stator core 12 illustrated in FIG. 2, the laminations are removed from the mandrel and are axially compressed. The compressed stack of laminations is then fastened together to form the stator core 12.

The laminations 14 are fastened together by suitable means and in the embodiment shown in FIGS. 1 and 2 a series of interlocking tabs 32 are used as described and claimed in U.S. Pat. No. 3,110,831 Zimmerle, issued Nov. 12, 1963 and assigned to the assignee of this invention. Compressing of the stacked laminations 14 forces the tabs 32 of each lamination to engage the edges of recesses formed by the tabs 32 of the next adjacent lamination as described in the aforementioned patent. Other suitable means for fastening the laminations 14 to form the stator core 10 may be employed such as welding across the outer edges 28 of the laminations 14 or by use of a key fitted into a mating slot.

Figure 3:
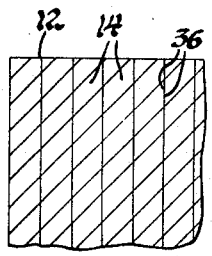
FIG. 3 is an exaggerated fragmentary sectional view taken along axis 3—3 in FIG. 1 illustrating the laminations of the magnetic core at ambient temperatures.
Figure 4:
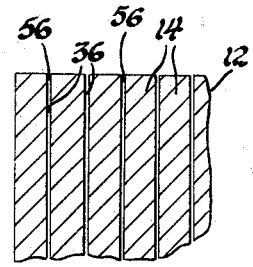
FIG. 4 is a view similar to FIG. 3 illustrating the laminations being deflected at elevated temperatures.
Figure 5:
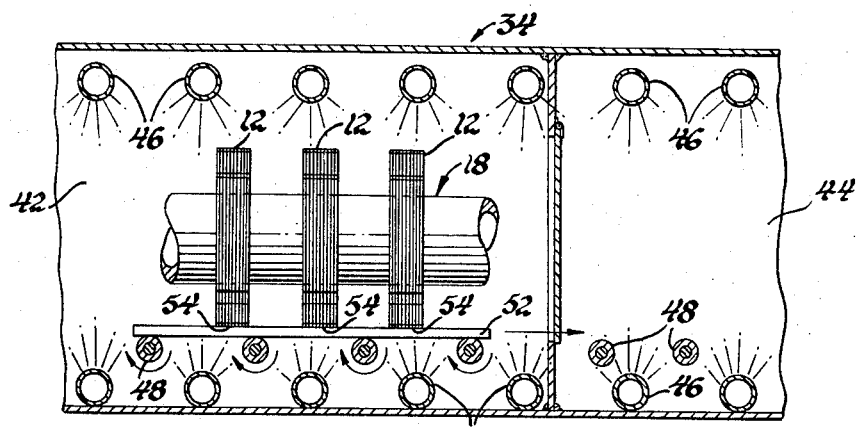
FIG. 5 is a diagrammatic view illustrating a furnace utilized for subjecting the laminated magnetic core to a heat treating operation in accordance with the method of this invention.

Following the fabrication of the laminations 14 into the stator core 12, it is known to place the core in a furnace, generally indicated at 34 in FIG. 4, for heat treating operations which typically include annealing or bluing treatments or both. These heat treatments are widely used and the annealing is normally required to enhance the magnetic as well as the mechanical characteristics of the stator core 12. For annealing, the stator core 12 is heated within a predetermined range of elevated temperatures in a controlled atmosphere. The bluing treatment is performed in a different controlled atmosphere and generally at a lower range of elevated temperatures to provide a desired oxide coating on the lamination outer edges 28 and on the lamination faces, indicated at 36 in FIGS. 3 and 4. This coating improves the handling and rust inhibiting characteristics of the stator core 12 as well as insulates the adjacent facing laminations. The annealing and bluing treatments can be effected in separate areas of the furnace 34 where the stator core 12 is subjected to different control atmospheres and different ranges of elevated temperatures. It is typical that the annealing is performed before bluing within the furnace 34, however, severe interlaminate bonding requires the core to be removed and separated by a cracking process between annealing and bluing.

The heat expandable fixture which is formed by the cylindrical plug 18 is made of a tubular metal material such as stainless steel selected from a family of austenitic nickel-chromium steels. One preferred stainless steel material which has been used successfully is A.I.S.I. Specification 310 stainless steel. This stainless steel material has a substantially higher coefficient of thermal expansion, in the order of $9.7 \times 10^{-6}$ inch per inch per degree F. in the range of 70° to 1600° F., than does the material of the laminations 14 which has a coefficient of thermal expansion in the order of $6.5 \times 10^{-6}$ inch per inch per degree F. in the range of 70° to 1600° F.

The stainless steel material of the heat expandable fixture has a high strength characteristic at the elevated temperatures developed for the heat treating operations, while the strength of the laminations 14 is substantially lower at these temperatures. The thickness of the wall 38 of the cylindrical plug 18 for use in the method of this invention as described further hereinbelow is in the order of ¼ to ½ inch when adapted for use in the bore openings 16 having diameter sizes in the range between 2½ to 4 inches. The outer diameter 40 of the cylindrical plug 18 has a predetermined maximum circular dimension so as to have a sliding clearance fit with the lamination inner edges 26 at ambient temperatures in the order of 70° F. The minimum circular dimension of the outer diameter 40 is such that when the cylindrical plug 18 and the stator core 12 are subjected to elevated temperatures of the heat treating operation the outer diameter 40 expands radially at a greater rate than do the tooth tips 24 so as to expand into engagement with the lamination inner edges 26.

Since the material of the cylindrical plug 18 is stronger in the heated condition than is the stator core 12, the outer diameter 40 will apply radial expansion forces against the tooth tips 24. The force develops stresses in the teeth 20 and the yoke section 22 of the stator core 12. In one preferred form, the minimum circular dimension of the outer diameter 40 is sufficient to be expanded against the sides of the bore openings 16 but develop stresses in the stator core 12 which are limited to below the yield stresses of the teeth 20 and the yoke section 22. This prevents permanent deformation of the bore opening 16. The length of the cylindrical plug 18 may be made sufficiently long for mounting in the bore openings 16 of several of the stator cores 12 as shown in FIG. 4.

The furnace 34 shown in FIG. 4 is a roller hearth furnace including separate chambers 42 and 44 for subjecting the stator core 12 to annealing and bluing heat treatments. Gas fired heat radiating tubes 46 are disposed within the furnace 34 above and below a series of motor driven rollers 48. A core support tray 52 is conveyed by the rollers 48 through the chambers 42 and 44. The heat tubes 46 are capable of heating the stator core 12 to an upper range of elevated temperature in the order of 1400 to 1600° F. with different controlled atmospheres being maintained inside the chambers 42 and 44.

In one example of the method of this invention, the stator core 12 is fabricated from the laminations 14 as described hereinabove and is readied for annealing and bluing heat treatment. Three of the stator cores 12, as shown in FIG. 4, receive the cylindrical plug 18 as it is inserted into the bore openings 16. The stator cores 12 with the cylindrical plug 18 are then placed on the tray 52 for conveying into the furnace 34. Each stator core 12 is positioned within the furnace 34 in a horizontally stacked relationship as it is carried by the tray 52. A bottom section 54 of the outer edges 28 of the laminations 14 rest on the tray 52 with the longitudinal axis of the bore opening 16 and of the cylindrical plug 18 being directed horizontally. This positions the laminations 14 so that faces 36 thereof are oriented in substantially parallel vertical planes as illustrated in FIG. 3 where the laminations are shown in an adjacent facing relationship before heating in the furnace 34. This has been found particularly helpful in carrying forth the method of this invention since it prevents gravitational forces from pressing the weight of one or more of the laminations 14 on the adjacent laminations.

In many previously known heat treating operations, a magnetic core 10 illustrated by the stator core 12 is usually oriented with the axis of the bore opening 16 extending vertically as it is subjected to heat treating operations. When the laminations 14 are stacked vertically, the upper laminations bear against the lower laminations thereby pressing the next adjacent of the lamination faces 36 together. Since there is some variation in the flatness of the laminations 14, contiguous areas that curve toward each other are pressed into especially tight contact. In the horizontally directed orientation of the stator cores 12 shown in FIG. 3, the weight of the laminations 14 is directed substantially solely downward toward the bottom sections 54 of the lamination outer edges 28 and against the tray 52. Accordingly, there is substantially no adjacent supporting relationship between the laminations 14. It is contemplated that a stator core 12 could be supported horizontally in the furnace 34 in a number of ways, for example, the cylindrical plug 18 can be suspended in the furnace 34 along horizontal axis.

In the specific example of the present invention described herein, the stator core 12 with the cylindrical plug 18 are initially conveyed into the chamber 42 of the furnace 34 for annealing. The stator core 12 and the cylindrical plug 18 are heated to an elevated temperature in the order of 1550° F. in a controlled annealing atmosphere. The cylindrical plug 18 expands into engagement with the inner edges 26 of the laminations 14 and maintains the engagement throughout the heat treating operations.

Before describing the method of this invention further, it is noted that in prior heat treating methods the faces 36 of the laminations 14 were often found to severely stick together due to an interlaminate bonding created during annealing. The heat and atmosphere conditions developing the interlaminate bonding between the laminations 14 were further enhanced as laminations were pressed together due to a vertical stacked relationship. As noted above, it has been proposed that oxide and/or iron composition coatings are formed on the faces 36 of adjacent laminations which diffuse causing the sticking or bonding together.

Accordingly, in the prior heat treating operations for the stator core 12 it was found that very high core losses resulted from the interlaminate bonding following annealing. This is because the laminations were effectively electrically interconnected by low resistance bonds formed between adjacent laminations. As a result, the eddy current core losses are found to be substantial factors in the core loss characteristics because of the interlaminate bonding. A further difficulty experienced by the interlaminate bonding due to annealing is that the bluing treatment, which follows the annealing treatment, is often not effective since the lamination faces cannot be exposed to the bluing atmosphere. This requires that the stator core 12 be removed from the furnace and subjected to cracking and then returned to the furnace to complete the bluing treatment.

However, in the present method, when the annealing of the stator core 12 is carried forth in the furnace 34 as described above, core loss measurements indicate that there is substantially reduced sticking and bonding together of the laminations during the annealing. One explanation that has been set forth to explain the reduction in interlaminate bonding of the laminations 14 during annealing, is that the radial expansion of the outer diameter 38 of the cylindrical plug 18 forces outwardly against the lamination inner edges 26 to retain them in an upright orientation preventing movement into closer and potentially more advantageous bonding relationship. Since the laminations are maintained in a vertical edgewise orientation they are prevented from being pressed together by the weight between the laminations. This is important since the lamination faces 36 appear to become activated by the elevated annealing temperature and annealing atmosphere, as noted hereinabove, so as to be susceptible to interlaminate bonding.

Further, it is observed that thermal expansion of the cylindrical plug 18 in the axial or longitudinal direction, being greater than longitudinal expansion of the stator core 12, tends to deflect the laminations 14 by spreading the lamination faces 36 apart as illustrated in FIG. 4. This provides separation spacings 56 between the laminations 14. The formation of the separation spacings 56 is indicated by an observed elongation between the ends of the stator core 12. Further it is believed, that since the lamination inner edges 26 can be slightly misaligned the radial expansion engagement by the cylindrical plug 18 causes radial deflections which further tend to destroy or prevent diffusion of the lamination coatings and sticking of adjacent laminations.

The reduced interlaminate bonding and separation spacings 56 further affords more effective bluing treatment by permitting the bluing atmosphere to permeate the interlamination areas. In the case of the stator core 12 as described herein, a satisfactory bluing treatment is performed immediately after the annealing treatment without an intermediate cracking step.

Upon completion of the heat treating operations and cooling of the strator core 12 and the cylindrical plug 18, the plug contracts from the sides of the bore opening 16 so that it is slidingly removable. The interlaminate bonding is sufficiently reduced so that no cracking or only slight cracking is required. The reduced bonding can be observed by the looseness of laminations 14 as the outer edges 28 are rubbed lightly.

In the example described hereinabove, the stator core 12 is of the type used in hermetically sealed induction motors made for refrigerating and air conditioning apparatus. The width of the core is 4.8 inches, the height is 5.3 inches and the diameter of the corners is 5.6 inches. The length is 2.25 inches and the diameter of the bore opening 16 is between 2.6520 and 2.6540 inches.

The cylindrical plug 18 mounted in the bore opening 16 in one successful mode of operation of this method includes a wall thickness 38 of 0.25 inch and an outer diameter 40 of 2.6430. This outer diameter size does not inelastically deform the bore opening 16 when the cylindrical plug 18 is thermally expanded against the lamination inner edges 26 to produce engagement in an interference fitting relationship therewith at the annealing temperature of 1550° F.

Core loss measurements were made for two samples of the stator core 12, after being subjected to annealing in accordance with the method of this invention. The core loss measurements consisted of applying an exciting voltage of thirteen volts to one of a pair of coil windings extending through the bores opening 16. The one coil winding is connected to the voltage input of a watt meter and the other coil winding, which is inductively coupled to the first coil winding by the strator core 12, is connected to the current input of the watt meter. The core losses observed for the two samples were 7.5 and 7.8 watts.

Two additional samples of the stator core 12 were subjected to the same heat treating operation as were the aforementioned samples, however these samples were oriented vertically on the tray 52 and did not include the cylindrical plug 18 mounted in the bore openings 16. Similar core loss measurements were made with an exciting voltage of thirteen volts. The core losses observed for these additional samples were 11.9 and 17.0 watts. Comparison of the core loss measurements between the two sets of samples indicates that substantially reduced core losses attributable to the substantial reduction in interlaminate bonding is provided by the method of this invention.

While the embodiment of the present invention for a method of reducing the interlaminate bonding of the stator core for dynamoelectric machines as described constitutes a preferred form, it is to be understood that other forms may be adopted without departing from the spirit of this invention. For example in the practice of the method of this invention involving a magnetic core which is welded, there has been observed a reduction of core losses following annealing which is sometimes not as great a reduction in the stator cores 16 which are fastened together by the interlocking tabs 32. However, although a cracking step may be required before completing the bluing treatment, or for further separation of the laminations, the impacting required is substantially reduced and considerably decreases the instances when the welds are seriously damaged or destroyed.

What is claimed is:

1. A method for reducing interlaminate bonding during a heat treating operation of a magnetic core having a series of laminations fastened together in axial registration so as to define an opening extending longitudinally therethrough, said method comprising the steps of: mounting a heat expandable fixture in said opening, said fixture having an outer dimension permitting sliding insertion into said opening at ambient temperatures and being thermally expandable so as to radially engage the sides of said opening when heated within a predetermined range of elevated temperatures accompanying said heat treating operation; orienting said magnetic core with said heat expandable fixture mounted therein so that the longitudinal axis of said opening extends substantially horizontally whereby negligible weight is exerted by one lamination upon an adjacent lamination; heating said magnetic core and said heat expandable fixture to a temperature within said predetermined range of elevated temperatures when said magnetic core is subjected to said heat treating operation whereby said heat expandable fixture expands radially against said sides of said opening and further expands longitudinally to elongate the ends thereof while in engagement with said sides of said opening so as to effect deflection of adjacent facing laminations for reducing interlaminate bonding normally accompanying said heat treating operation.

2. A method for reducing interlaminate bonding during a heat treating operation of a magnetic core having a series of laminations made of a thin lamination steel material and fastened together in axial registration so that inner edges of said series of laminations define an opening extending longitudinally therethrough, said method comprising the steps of: mounting a heat expansible fixture in said opening, said fixture being made of stainless steel material having a higher coefficient of thermal expansion than said lamination steel material and having an outer dimension permitting sliding insertion into said opening at ambient temperatures and being thermally expandable into engagement with said inner edges when heated within a predetermiied range of elevated temperatures accompanying said heat treating operation; orienting said magnetic core with said heat expandable fixture mounted therein so that adjacent faces of said series of laminations are aligned in substantially parallel vertical planes whereby negligible weight is exerted by one lamination upon a next adjacent lamination; heating said magnetic core and said heat expandable fixture to a temperature within said predetermined range of elevated temperatures when said magnetic core is subjected to said heat treating operation whereby said heat expandable fixture expands radially against said inner edges and further expands longitudinally to elongate the ends thereof while an engagement with said inner edges of said opening so as to effect deflection of adjacent facing laminations for reducing interlaminate bonding normally accompanying said heat treating operation.

3. A method for reducing interlaminate bonding accompanying a heat treating operation for a series of laminations forming a stator core of a dynamoelectric machine having series of teeth terminating in tooth tips defining a cylindrical bore opening, said method comprising the steps of: mounting a heat expandable cylindrical fixture in said bore opening, said fixture having an outer diameter permitting sliding insertion into said center bore opening at ambient temperatures and being thermally expandable into engagement with said tooth tips when heated within a predetermined range of elevated temperatures developed by said heat treating operation; positioning said magnetic core with said heat expandable cylindrical fixture mounted therein in a furnace effective to subject said stator core to said heat treating operation so that said positioning orients the axis of said bore opening substantially horizontally whereby the faces of said laminations extend along substantially vertical planes and negligible gravitation force is exerted between adjacent faces of said laminations; heating said magnetic core and said heat expandable cylindrical fixture in said furnace to effect said heat treating operation whereby said heat expandable cylindrical fixture expands radially against said tooth tips when heated to said predetermined range of elevated temperatures and concurrently is thermally elongated while in engagement with said tooth tips so as to effect deflection between adjacent facing laminations and substantially reduce said interlaminate bonding therebetween.

4. A method for reducing interlaminate bonding accompanying a heat treating operation for a series of steel laminations fastened together in interlocking relationship for forming a stator core of a dynamoelectric machine having series of teeth terminating in tooth tips defining a cylindrical bore opening, said method comprising the steps of: mounting a heat expandable cylindrical plug in said bore opening, said cylindrical plug being made of a metal material having a higher coefficient of thermal expansion higher than said steel laminations and having an outer diameter permitting sliding insertion into said center bore opening at ambient temperatures and being thermally expandable into engagement with said tooth tips when heated within a predetermined range of elevated temperatures developed by said heat treating operation so as to limit stresses developed by the engagement with said tooth tips to below the yield stresses of said steel laminations; positioning said magnetic core with said heat expandable cylindrical fixture mounted therein in a furnace effective to subject said stator core to said heat treating operation so that said positioning orients the axis of said bore opening substantially horizontally whereby the faces of said laminations extend along substantially vertical planes and negligible gravitation force is exerted between adjacent faces of said lamination; heating said magnetic core and heat expandable cylindrical fixture in said furnace to effect said heat treating operation whereby said heat expandable cylindrical fixture expands radially against said tooth tips when heated to said predetermined range of elevated temperatures and concurrently is thermally elongated while in engagement with said tooth tips so as to effect deflection between adjacent facing laminations and substantially reduce said interlaminate bonding therebetween.

References Cited

UNITED STATES PATENTS

| | | | |
|---|---|---|---|
| 1,556,209 | 10/1925 | Dressler | 148—131 |
| 1,745,403 | 2/1930 | Caugherty | 148—131 X |
| 2,066,515 | 1/1937 | Bishop | 148—131 X |
| 2,890,143 | 6/1959 | Bingel | 148——112 |
| 3,095,333 | 6/1963 | Sweeney et al. | 148—112 X |

L. DEWAYNE RUTLEDGE, Primary Examiner

G. K. WHITE, Assistant Examiner

U.S. Cl. X.R.

148—121, 131